US012742883B2

(12) United States Patent
Gao et al.

(10) Patent No.: US 12,742,883 B2
(45) Date of Patent: Sep. 22, 2026

(54) METHOD AND SYSTEM FOR CONSTRUCTING ROCKBOLT FORCE INVERSION MODEL BASED ON LASER SCANNING OF BEARING PLATE

(71) Applicants: CCTEG Coal Mining Research Institute, Beijing (CN); CCTEG TIANDI SCIENCE & TECHNOLOGY CO., LTD., Beijing (CN)

(72) Inventors: Fuqiang Gao, Beijing (CN); Wenju Liu, Beijing (CN); Jinfu Lou, Beijing (CN); Shuangyong Dong, Beijing (CN); Guiyang Yuan, Beijing (CN); Lei Yang, Beijing (CN); Xiaoqing Wang, Beijing (CN); Jinghe Yang, Beijing (CN); Jianzhong Li, Beijing (CN); Shuwen Cao, Beijing (CN)

(73) Assignees: CCTEG Coal Mining Research Institute, Beijing (CN); CCTEG Tiandi Science & Technology Co., LTD., Beijing (CN)

( * ) Notice: Subject to any disclaimer, the term of this patent is extended or adjusted under 35 U.S.C. 154(b) by 575 days.

(21) Appl. No.: 18/452,659

(22) Filed: Aug. 21, 2023

(65) Prior Publication Data

US 2024/0302528 A1 Sep. 12, 2024

Related U.S. Application Data

(63) Continuation of application No. PCT/CN2023/100776, filed on Jun. 16, 2023.

(30) Foreign Application Priority Data

Mar. 8, 2023 (CN) ........................ 202310217498.6

(51) Int. Cl.
*G01S 17/42* (2006.01)
*G01S 17/89* (2020.01)
(Continued)

(52) U.S. Cl.
CPC .............. *G01S 17/42* (2013.01); *G01S 17/89* (2013.01); *G06N 3/08* (2013.01); *G06T 7/0004* (2013.01);
(Continued)

(58) Field of Classification Search
CPC ....... G01B 2210/66; G01S 17/42; G01L 1/24; B68C 2001/022
(Continued)

(56) References Cited

U.S. PATENT DOCUMENTS 3,462,223 A * 8/1969 Engeler .................. G01B 11/16 73/800
3,872,719 A * 3/1975 Beus ....................... G01L 5/243 73/761
(Continued)

FOREIGN PATENT DOCUMENTS

CN 107228723 A 10/2017
CN 107328502 A 11/2017
CN 111365051 A 7/2020

OTHER PUBLICATIONS

ISR for PCT application PCT/CN2023/100776.
(Continued)

*Primary Examiner* — Christopher D Hutchens
(74) *Attorney, Agent, or Firm* — Maginot, Moore & Beck, LLP

(57) ABSTRACT

A method for constructing a rockbolt force inversion model based on laser scanning of a bearing plate includes: acquiring a first morphological point cloud of the bearing plate based on a laser scanner; acquiring a second morphological
(Continued)

point cloud of the bearing plate based on the laser scanner; and constructing the rockbolt force inversion model based on a preset convolutional neural network, the first morphological point cloud, the second morphological point cloud and a rockbolt force value.

20 Claims, 4 Drawing Sheets

(51) Int. Cl.
*G06N 3/08* (2023.01)
*G06T 7/00* (2017.01)
*G01L 1/24* (2006.01)

(52) U.S. Cl.
CPC ...... *G01L 1/24* (2013.01); *G06T 2207/10028* (2013.01); *G06T 2207/20036* (2013.01); *G06T 2207/20081* (2013.01); *G06T 2207/20084* (2013.01)

(58) Field of Classification Search
USPC ........................................................... 356/32
See application file for complete search history.

(56) References Cited

U.S. PATENT DOCUMENTS

| | | | | |
|---|---|---|---|---|
| 4,591,996 | A * | 5/1986 | Vachon | G01B 11/164 702/42 |
| 4,859,062 | A * | 8/1989 | Thurn | G01N 21/474 356/600 |
| 9,311,566 | B2 * | 4/2016 | Iliopoulos | G01B 11/16 |
| 11,554,496 | B2 * | 1/2023 | Tang | G06N 3/0464 |
| 2013/0013224 | A1 * | 1/2013 | Ito | G01B 11/0608 702/42 |
| 2018/0202799 | A1 * | 7/2018 | Tollison | G01M 15/14 |
| 2020/0210814 | A1 * | 7/2020 | Mehr | G06N 3/088 |
| 2022/0214157 | A1 * | 7/2022 | Eliasson | G01B 11/16 |
| 2023/0260153 | A1 * | 8/2023 | Saric | E02F 9/264 382/103 |
| 2023/0374904 | A1 * | 11/2023 | Locotos | E21D 21/0086 |
| 2025/0020523 | A1 * | 1/2025 | Kennedy, III | G01L 5/166 |

OTHER PUBLICATIONS

English translation of ISR for PCT application PCT/CN2023/100776.

"Bolt Stress Calculation of Carbonaceous Rock Tunnel Based on Artificial Neural Network", Wang et al., Safety and Environmental Engineering, vol. 27, No. 2, Mar. 2020.

* cited by examiner

METHOD AND SYSTEM FOR CONSTRUCTING ROCKBOLT FORCE INVERSION MODEL BASED ON LASER SCANNING OF BEARING PLATE

CROSS-REFERENCE TO RELATED APPLICATIONS

This application is continuation application of International Application No. PCT/CN2023/100776, filed Jun. 16, 2023, which is based upon and claims priority to Chinese Patent Application 202310217498.6, filed Mar. 8, 2023, the entire contents of which are incorporated herein by reference.

FIELD

The present disclosure relates to the field of computer technology, and particularly to a method and system for constructing a rockbolt force inversion model based on laser scanning of a bearing plate.

BACKGROUND

Currently, a loading condition of a rockbolt is mainly monitored by a sensor monitoring method. A sensor is attached to a surface of the rockbolt before the rockbolt is installed, so that the loading condition of the rockbolt is monitored by the sensor on the rockbolt. Further, in order to collect data stably, the sensor needs to transmit the collected data through a wire, which leaves a gap between the rockbolt and a borehole, thus affecting the support effect of the rockbolt. As each rockbolt needs to be provided with a sensor, the costs for monitoring the rockbolt force are increased.

SUMMARY

In a first aspect, embodiments of the present disclosure provide a method for constructing a rockbolt force inversion model based on laser scanning of a bearing plate, which includes: acquiring a first morphological point cloud of the bearing plate based on a laser scanner; the first morphological point cloud being a point cloud acquired in a case where no loading is applied to a rockbolt; acquiring a second morphological point cloud of the bearing plate based on the laser scanner; the second morphological point cloud being a point cloud acquired in a loading condition of the rockbolt; and constructing the rockbolt force inversion model based on a preset convolutional neural network, the first morphological point cloud, the second morphological point cloud and a rockbolt force value. The preset convolutional neural network is a feed-forward neural network containing a convolutional computation and having a depth structure; and the rockbolt force value is a tension value acquired in the loading condition of the rockbolt.

In a second aspect, embodiments of the present disclosure also provide an electronic device, which includes a memory, a processor and a computer program stored in the memory and runnable on the processor. The processor, when executing the computer program, implements the method for constructing the rockbolt force inversion model based on the laser scanning of the bearing plate as described in the first aspect.

In a third aspect, embodiments of the present disclosure also provide a non-transitory computer-readable storage medium, which includes a computer program that, when executed by a processor, causes the method for constructing the rockbolt force inversion model based on the laser scanning of the bearing plate as described in the first aspect to be implemented.

BRIEF DESCRIPTION OF THE DRAWINGS

In order to clearly illustrate the technical solutions in the present disclosure, the accompanying drawings to be used in the descriptions of embodiments of the present disclosure or the related art will be briefly introduced below. Apparently, the drawings in the following description only show some embodiments of the present disclosure, and other drawings may be obtained by those skilled in the art according to these drawings without any creative effort.

DETAILED DESCRIPTION

Figure 1:
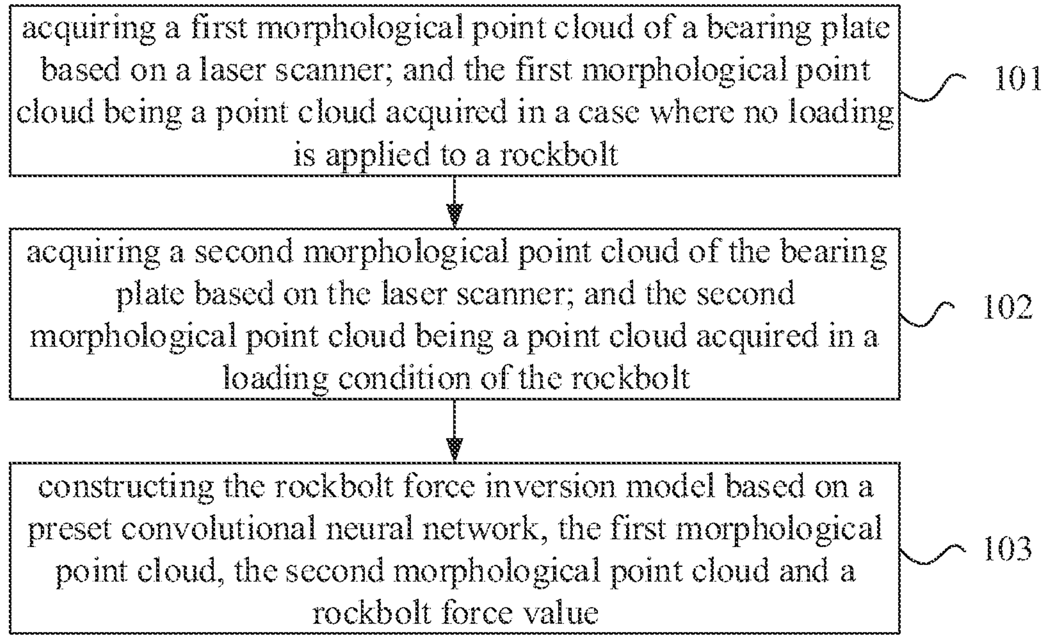
FIG. 1 is a schematic flowchart of a method for constructing a rockbolt force inversion model based on laser scanning of a bearing plate provided by embodiments of the present disclosure.

In order to make the purpose, technical solutions and advantages of the present disclosure clearer, the following will clearly and completely describe the technical solutions in the present disclosure with reference to the accompanying drawings. The described embodiments are some of embodiments of the present disclosure, not all embodiments of the present disclosure, and all other embodiments obtained by those skilled in the art based on the embodiments of the present disclosure without making creative works belong to the protection scope of the present disclosure.

The present disclosure provides a method and system for constructing a rockbolt force inversion model based on laser scanning of a bearing plate, which aims to accurately monitor a loading condition of a rockbolt while reducing the monitoring costs.

Embodiments of the present disclosure provide a method for constructing a rockbolt force inversion model based on laser scanning of a bearing plate, which includes: acquiring a first morphological point cloud of the bearing plate based on a laser scanner; the first morphological point cloud being a point cloud acquired in a case where no loading is applied to a rockbolt; acquiring a second morphological point cloud of the bearing plate based on the laser scanner; the second morphological point cloud being a point cloud acquired in a loading condition of the rockbolt; and constructing the rockbolt force inversion model based on a preset convolutional neural network, the first morphological point cloud, the second morphological point cloud and a rockbolt force value. The preset convolutional neural network is a feed-forward neural network containing a convolutional computation and having a depth structure; and the rockbolt force value is a tension value acquired in the loading condition of the rockbolt.

In an embodiment, constructing the rockbolt force inversion model based on the preset convolutional neural network, the first morphological point cloud, the second morphological point cloud, and the rockbolt force value includes: obtaining deformation data based on the first morphological point cloud and the second morphological point cloud; and constructing the rockbolt force inversion model based on the preset convolutional neural network, the deformation data and the rockbolt force value.

In an embodiment, obtaining the deformation data based on the first morphological point cloud and the second morphological point cloud includes: determining a first target point cloud in the first morphological point cloud, and determining a second target point cloud in the second morphological point cloud, the first target point cloud having a same horizontal coordinate as the second target point cloud, and the first target point cloud having a same longitudinal coordinate as the second target point cloud; obtaining offset data of the bearing plate based on a vertical coordinate of the first target point cloud and a vertical coordinate of the second target point cloud; and obtaining the deformation data based on the horizontal and longitudinal coordinates of the first target point cloud and the offset data.

In an embodiment, constructing the rockbolt force inversion model based on the preset convolutional neural network, the deformation data and the rockbolt force value includes: extracting a two-dimensional spatial feature based on the preset convolutional neural network, the deformation data and the rockbolt force value; and performing a model training with the two-dimensional spatial feature as input data and with the rockbolt force value as prediction data to obtain the rockbolt force inversion model.

In an embodiment, extracting the two-dimensional spatial feature based on the preset convolutional neural network, the deformation data and the rockbolt force value includes: performing an inner product operation on the deformation data via the preset convolutional neural network with the rockbolt force value as a label to obtain the two-dimensional spatial feature.

In an embodiment, acquiring the first morphological point cloud of the bearing plate based on the laser scanner includes: acquiring distance values, vertical angle values and horizontal angle values of points to be measured in the bearing plate based on the laser scanner; obtaining three-dimensional coordinates of the points to be measured according to the distance values, the vertical angle values and the horizontal angle values of the points to be measured; and collecting the three-dimensional coordinates of the points to be measured to obtain the first morphological point cloud.

In an embodiment, after constructing the rockbolt force inversion model based on the preset convolutional neural network, the first morphological point cloud, the second morphological point cloud and the rockbolt force value, the method further includes: acquiring a third morphological point cloud of a bearing plate to be monitored based on the laser scanner, the third morphological point cloud being a point cloud acquired in a loading condition of a rockbolt of the bearing plate to be monitored; and inputting the third morphological point cloud into the rockbolt force inversion model to output the loading condition of the rockbolt of the bearing plate to be monitored through the rockbolt force inversion model.

Embodiments of the present disclosure provide a system for constructing a rockbolt force inversion model based on laser scanning of a bearing plate, which includes: a first data acquisition module configured to obtain a first morphological point cloud of a bearing plate based on a laser scanner, the first morphological point cloud being a point cloud acquired in a case where no loading is applied to a rockbolt; a second data acquisition module configured to obtain a second morphological point cloud of the bearing plate based on the laser scanner, the second morphological point cloud being a point cloud acquired in a loading condition of the rockbolt; and a model construction module configured to construct the rockbolt force inversion model based on a preset convolutional neural network, the first morphological point cloud, the second morphological point cloud and a rockbolt force value. The preset convolutional neural network is a feed-forward neural network containing a convolutional computation and having a depth structure; and the rockbolt force value is a tension value acquired in the loading condition of the rockbolt.

Embodiments of the present disclosure also provide an electronic device, which includes a memory, a processor and a computer program stored in the memory and runnable on the processor. The processor, when executing the computer program, implements the method for constructing the rockbolt force inversion model based on the laser scanning of the bearing plate as described in the first aspect.

Embodiments of the present disclosure also provide a non-transitory computer-readable storage medium, which includes a computer program that, when executed by a processor, causes the method for constructing the rockbolt force inversion model based on the laser scanning of the bearing plate as described in the first aspect to be implemented.

Embodiments of the present disclosure also provide a computer program product including a computer program that, when executed by a processor, causes the method for constructing the rockbolt force inversion model based on the laser scanning of the bearing plate as described in the first aspect to be implemented.

With the method and system for constructing the rockbolt force inversion model based on the laser scanning of the bearing plate, the electronic device and the storage medium provided in the present disclosure, the first morphological point cloud of the bearing plate is acquired based on the laser scanner; the second morphological point cloud of the bearing plate is acquired based on the laser scanner; and the rockbolt force inversion model is constructed based on the preset convolutional neural network, the first morphological point cloud, the second morphological point cloud and the rockbolt force value.

In the process of monitoring the loading condition of the rockbolt, the point cloud of the bearing plate is acquired by the laser scanner, and the loading condition of the rockbolt is accurately monitored based on the point cloud, so there is no need to install an sensor on the rockbolt, which not only reduces the costs for monitoring the rockbolt force, but also avoids the influence of the gap between the rockbolt and the borehole on the rockbolt support effect. Further, a local receptive field, weight sharing and pooling layers of the convolutional neural network effectively reduce a size of network parameters, and have a good fault tolerance and parallelism ability. Therefore, the rockbolt force inversion model constructed through the convolutional neural network and the point cloud can accurately monitor the loading condition of the rockbolt.

Embodiments of the present disclosure provide a method for constructing a rockbolt force inversion model based on laser scanning of a bearing plate. It should be noted that although a logical sequence is shown in the flowchart, the steps shown or described may be implemented in a different sequence than that shown herein in certain data case.

FIG. 1 is a schematic flowchart of a method for constructing a rockbolt force inversion model based on laser scanning of a bearing plate provided by embodiments of the present disclosure. Referring to FIG. 1, the method for constructing the rockbolt force inversion model based on the laser scanning of the bearing plate provided by embodiments of the present disclosure includes:

- step 101, acquiring a first morphological point cloud of the bearing plate based on a laser scanner; the first morphological point cloud being a point cloud acquired in a case where no loading is applied to a rockbolt;
- step 102, acquiring a second morphological point cloud of the bearing plate based on the laser scanner; the second morphological point cloud being a point cloud acquired in a loading condition of the rockbolt; and
- step 103, constructing the rockbolt force inversion model based on a preset convolutional neural network, the first morphological point cloud, the second morphological point cloud and a rockbolt force value.

It should be noted that embodiments of the present disclosure describe the method for constructing the rockbolt force inversion model based on the laser scanning of the bearing plate with a model construction system as an executing body, and the executing body is not limited to the model construction system in actual operation.

Figure 2:
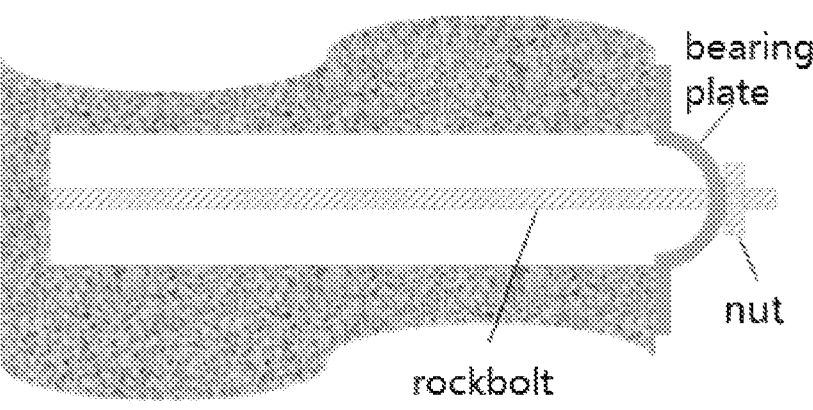
FIG. 2 is a schematic diagram of rockbolt support installation provided by embodiments of the present disclosure.

Specifically, when the rockbolt force inversion model needs to be constructed, the worker fixes an end of the rockbolt to the rock body, and sets the bearing plate around an exposed end of the rockbolt through a nut to make the bearing plate just in contact with the rock body. At this time, there is no interaction force between the bearing plate and the rock body, i.e., the rockbolt is not subjected to any loading. FIG. 2 is a schematic diagram of rockbolt support installation provided by embodiments of the present disclosure, where the installation of the bearing plate, the rockbolt and the nut is completed.

Further, the model construction system determines points to be measured on a surface of the bearing plate according to a preset rule, and acquires point cloud coordinates of each point to be measured by a laser scanner to obtain a first morphological point cloud of the bearing plate, and the preset rule is set by the model construction system according to actual needs.

Figure 3:
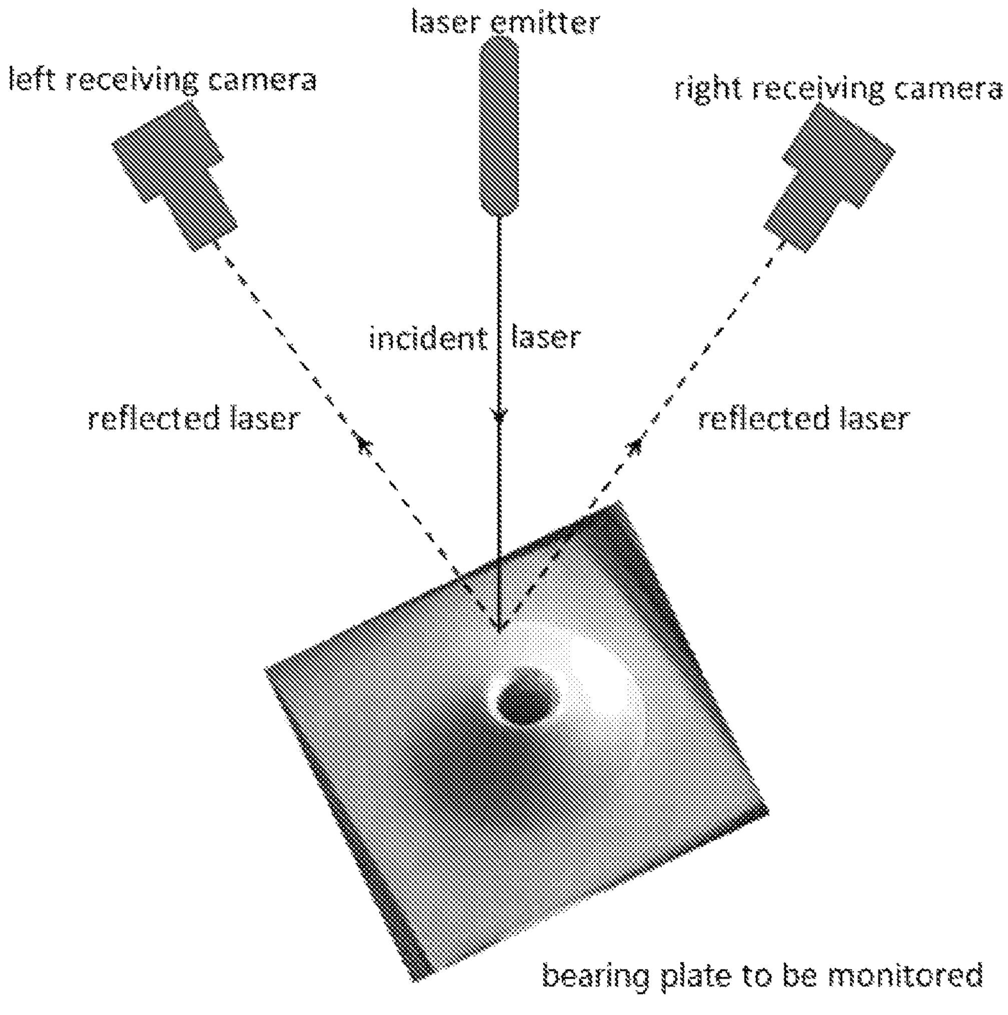
FIG. 3 is a schematic diagram for acquiring point cloud coordinates provided by embodiments of the present disclosure.

In an embodiment, the laser scanner includes a laser emitter, a left receiving camera, and a right receiving camera. Further, the laser scanner emits lasers to the point to be measured and records emission time and an emission angle of the lasers. Further, the laser scanner receives reflected lasers via the left receiving camera and/or the right receiving camera and records reception time of the lasers. Further, the laser scanner determines a distance between the point to be measured and the laser emitter according to the emission time and the reception time of the lasers. Further, the laser scanner determines the point cloud coordinates of the point to be measured according to the distance between the point to be measured and the laser emitter, a location of the laser emitter, and the emission angle of the lasers. A schematic diagram where a laser scanner acquires point cloud coordinates of a point to be measured is shown in FIG. 3, which is a first schematic diagram for acquiring the point cloud coordinates provided by embodiments of the present disclosure.

Figure 4:
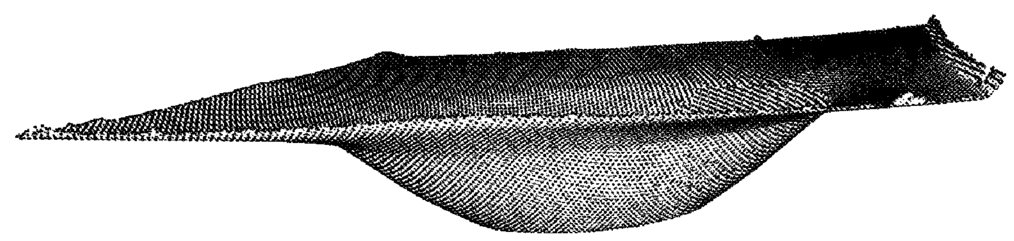
FIG. 4 is a schematic diagram of a morphological point cloud provided by embodiments of the present disclosure.

Further, after acquiring the point cloud coordinates of each point to be measured as described in the above embodiment, the laser scanner collects the point cloud coordinates of each point to be measured to obtain a morphological point cloud of the bearing plate. A schematic diagram of a morphological point cloud acquired by a laser scanner is shown in FIG. 4, which is a schematic diagram of a morphological point cloud provided by embodiments of the present disclosure.

Further, the laser scanner sends the first morphological point cloud to the model construction system. The laser scanner and the model construction system are connected by a wireless manner or a wired manner, the wireless manner includes, but is not limited to, a Bluetooth manner and a wireless local area network manner, and the wired manner includes, but is not limited to, a serial connection manner.

It should be noted that the model construction system is provided with the preset convolutional neural network, and the rockbolt force inversion model is constructed by the preset convolutional neural network. The preset convolutional neural network is a feed-forward neural network containing a convolutional computation and having a depth structure, and is a kind of depth learning algorithm. Further, the structure of the preset convolutional neural network includes a convolutional layer, a pooling layer, and a fully connected layer.

Further, the worker pressurizes the rockbolt to a rockbolt force value, so that the rockbolt is in a loading condition. The rockbolt force value is set by the model construction system according to an actual situation. It should be noted that rockbolt force values may be force values with a same gradient, for example, 10 kN (kilonewton), 20 kN, 30 kN, etc.

It should be noted that there are two manners to pressurize the rockbolt to the rockbolt force value: a first one is to apply a tension manually, and a second one is to apply a tension by a rockbolt testing device, where the rockbolt testing device is a device used in the related art to apply various combining forces to the rockbolt.

For applying a tension manually, the specific operation is that: the worker pressurizes the rockbolt to the rockbolt force value by means of a rockbolt puller.

For applying a tension by the rockbolt testing device, the specific operation is that: the worker installs the bearing plate, the rockbolt and the nut on the rockbolt testing device and applies different loads to the rockbolt through the rockbolt testing device.

Further, the model construction system determines points to be measured on a surface of the bearing plate according to a preset rule, and acquires point cloud coordinates of each point to be measured by the laser scanner to obtain the second morphological point cloud of the bearing plate.

Further, the laser scanner sends the second morphological point cloud and a corresponding rockbolt force value to the model construction system.

Further, after the model construction system receives the first morphological point cloud, the second morphological point cloud and the corresponding rockbolt force value, the first morphological point cloud and the second morphological point cloud are compared and analyzed by the preset convolutional neural network to obtain a change of the morphological point cloud.

Further, the model construction system performs a model training through the preset convolutional neural network with the change of the morphological point cloud as input data and with the rockbolt force value as prediction data to obtain the rockbolt force inversion model.

With the method and system for constructing the rockbolt force inversion model based on the laser scanning of the bearing plate, the electronic device and the storage medium provided in the present disclosure, the first morphological point cloud of the bearing plate is acquired based on the laser scanner; the second morphological point cloud of the bearing plate is acquired based on the laser scanner; and the rockbolt force inversion model is constructed based on the preset convolutional neural network, the first morphological point cloud, the second morphological point cloud and the rockbolt force value.

In the process of monitoring the loading condition of the rockbolt, the point cloud of the bearing plate is acquired by the laser scanner, and the loading condition of the rockbolt is accurately monitored based on the point cloud, so there is no need to install a sensor on the rockbolt, which not only reduces the costs for monitoring the rockbolt force, but also avoids the influence of the gap between the rockbolt and the borehole on the rockbolt support effect. Further, a local receptive field, weight sharing and pooling layers of the convolutional neural network effectively reduce a size of network parameters, and have a good fault tolerance and parallelism ability. Therefore, the rockbolt force inversion model constructed through the convolutional neural network and the point cloud can accurately monitor the loading condition of the rockbolt.

Further, acquiring the first morphological point cloud of the bearing plate based on the laser scanner as described in step 101 includes: acquiring distance values, vertical angle values and horizontal angle values of points to be measured in the bearing plate based on the laser scanner; obtaining three-dimensional coordinates of the points to be measured according to the distance values, the vertical angle values and the horizontal angle values of the points to be measured; and collecting the three-dimensional coordinates of the points to be measured to obtain the first morphological point cloud.

Specifically, after the rockbolt, the bearing plate, the nut and the laser scanner have been installed, the model construction system determines the points to be measured on the surface of the bearing plate according to the preset rule.

Further, the laser scanner establishes a spatial rectangular coordinate system with a location of the laser emitter as an origin.

Further, the laser scanner sends lasers to the point to be measured and records emission time and an emission angle of the laser.

Further, the laser scanner receives a reflected laser through a detector and records reception time of the laser.

Figure 5:
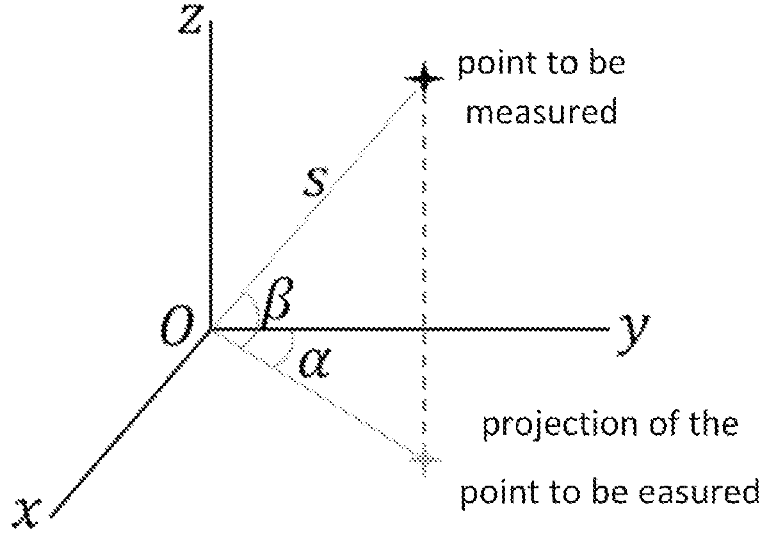
FIG. 5 is a schematic diagram for acquiring point cloud coordinates provided by embodiments of the present disclosure.

Further, the laser scanner calculates a distance value between the point to be measured and the origin by using the emission time and return time of the laser, and determines an angle formed by the laser and a vertical axis as the vertical angle value, and an angle formed by the laser and a longitudinal axis as the horizontal angle value. A schematic diagram of a laser scanner to acquire a distance value, a vertical angle value and a horizontal angle value of a point to be measured is shown in FIG. 5, which is a second schematic diagrams for acquiring point cloud coordinates provided by embodiments of the present disclosure, where S is a distance value, $\alpha$ is a horizontal angle value, and $\beta$ is a vertical angle value.

Further, the laser scanner performs coordinate transformation on the distance value, the vertical angle value and the horizontal angle value of the point to be measured to obtain three-dimensional coordinates of the point to be measured, and the transformation formulas are as follows:

$$S = \frac{1}{2} c \Delta t;$$

$$y = S \cos \beta \cos \alpha; \text{ and}$$

$$z = S \sin \beta;$$

where S is the distance value, c is a speed of light, $\Delta t$ is a time interval between laser emission and laser return, $\alpha$ is the horizontal angle value, $\beta$ is the vertical angle value, x is a horizontal coordinate, y is a longitudinal coordinate, and z is a vertical coordinate.

Further, after obtaining the three-dimensional coordinates of each point to be measured, the laser scanner collects the three-dimensional coordinates of each point to be measured to obtain the first morphological point cloud.

Embodiments of the present disclosure perform the coordinate transformation on the distance values, the vertical angle values and the horizontal angle values of the points to be measured to obtain the three-dimensional coordinates of the points to be measured, which not only facilitates the subsequent one-to-one correspondence between the first morphological point cloud and the second morphological point cloud, but also facilitates obtaining a deformation value of each point to be measured, thus facilitating the comparison and analysis of the first morphological point cloud and the second morphological point cloud through the preset convolutional neural network.

Further, constructing the rockbolt force inversion model based on the preset convolutional neural network, the first morphological point cloud, the second morphological point cloud, and the rockbolt force value as described in step 103 includes: obtaining deformation data based on the first morphological point cloud and the second morphological point cloud; and constructing the rockbolt force inversion model based on the preset convolutional neural network, the deformation data and the rockbolt force value.

Specifically, after the model construction system receives the first morphological point cloud, the second morphological point cloud and corresponding rockbolt force value, the first morphological point cloud and the second morphological point cloud are compared and analyzed through the preset convolutional neural network to obtain a deformation condition of the bearing plate, and the deformation data is determined according to the deformation condition of the bearing plate.

Further, the model construction system performs a model training through the preset convolutional neural network with the deformation data as input data and with the rockbolt force value as prediction data to obtain the rockbolt force inversion model.

In embodiments of the present disclosure, the deformation condition of the bearing plate is obtained by comparing the first morphological point cloud with the second morphological point cloud, the deformation data is determined according to the deformation condition of the bearing plate, and the model training is performed by using the deformation data and the rockbolt force value, so that the rockbolt force inversion model can accurately monitor a loading condition of the rockbolt through the point cloud.

Further, obtaining the deformation data based on the first morphological point cloud and the second morphological point cloud includes: determining a first target point cloud in the first morphological point cloud, and determining a second target point cloud in the second morphological point cloud; the first target point cloud having a same horizontal coordinate as the second target point cloud, and the first target point cloud having a same longitudinal coordinate as the second target point cloud; obtaining offset data of the bearing plate based on a vertical coordinate of the first target point cloud and a vertical coordinate of the second target point cloud; and obtaining the deformation data based on the horizontal and longitudinal coordinates of the first target point cloud and the offset data.

Specifically, after receiving the first morphological point cloud, the second morphological point cloud and the corresponding rockbolt force value, the model construction system determines any point cloud data in the first morphological point cloud as the first target point cloud and determines the second target point cloud in the second morphological point cloud through the preset convolutional neural network. The first target point cloud has the same horizontal coordinate as the second target point cloud, and the first target point cloud has the same longitudinal coordinate as the second target point cloud.

It should be noted that when the second target point cloud cannot be determined in the second morphological point cloud, i.e., when the first morphological point cloud and the second morphological point cloud cannot correspond to each other one-by-one through the three-dimensional coordinates due to excessive deformation of the bearing plate, the model construction system modifies the three-dimensional coordinates of the first morphological point cloud and the second morphological point cloud according to a specific location of the point to be measured on the bearing plate.

In an embodiment, since both the first morphological point cloud and the second morphological point cloud are obtained by measuring the points to be measured in sequence with the laser scanner according to the preset rule, an acquisition sequence of the morphological point cloud is related to the specific location of the point to be measured on the bearing plate, i.e., the first target point cloud and the second target point cloud can be determined according to the acquisition sequence. Specifically, the model construction system replaces a horizontal coordinate of first acquired point cloud data in the first morphological point cloud with 1, replaces a horizontal coordinate of second acquired point cloud data in the first morphological point cloud with 2, and so on, so that the horizontal coordinate of each point cloud data in the first morphological point cloud is replaced with the corresponding acquisition sequence. Further, the model construction system replaces a horizontal coordinate of first acquired point cloud data in the second morphological point cloud with 1, replaces a horizontal coordinate of second acquired point cloud data in the second morphological point cloud with 2, and so on, so that the horizontal coordinate of each point cloud data in the second morphological point cloud is replaced with the corresponding acquisition sequence. Further, the model construction system determines any point cloud data in the first morphological point cloud as the first target point cloud and determines the second target point cloud in the second morphological point cloud. The first target point cloud has the same horizontal coordinate as the second target point cloud.

In an embodiment, the model construction system sorts each point cloud data in the first morphological point cloud according to the horizontal and longitudinal coordinates of each point cloud data in the first morphological point cloud to obtain a first point cloud matrix. Further, the model construction system replaces the horizontal coordinate of each point cloud data in the first morphological point cloud with a matrix row in which the point cloud data is located, and replaces the longitudinal coordinate of each point cloud data with a matrix column in which the point cloud data is located. Further, the model construction system sorts each point cloud data in the second morphological point cloud according to the horizontal and longitudinal coordinates of each point cloud data in the second morphological point cloud to obtain a second point cloud matrix. Further, the model construction system replaces the horizontal coordinate of each point cloud data in the second morphological point cloud with a matrix row in which the point cloud data is located, and replaces the longitudinal coordinate of each point cloud data with a matrix column in which the point cloud data is located. Further, the model construction system determines any point cloud data in the first morphological point cloud as the first target point cloud and determines the second target point cloud in the second morphological point cloud. The first target point cloud has the same horizontal coordinate as the second target point cloud, and the first target point cloud has the same longitudinal coordinate as the second target point cloud.

Further, the model construction system performs a subtraction on the vertical coordinate of the first target point cloud and the vertical coordinate of the second target point cloud through the preset convolutional neural network to obtain a difference value, and determines the difference value as offset data of the bearing plate.

Further, the model construction system collects the horizontal and longitudinal coordinates of the first target point cloud and a corresponding offset data through the preset convolutional neural network to obtain the deformation data.

In embodiments of the present disclosure, the offset data of the bearing plate is obtained from the vertical coordinate of the first target point cloud and the vertical coordinate of the second target point cloud, and the offset data thus obtained can accurately represent the deformation of the point to be measured. At the same time, the horizontal and longitudinal coordinates of the first target point cloud, and the corresponding offset data are collected, so as to bind the coordinates of the point to be measured to the offset data.

Further, constructing the rockbolt force inversion model based on the preset convolutional neural network, the deformation data and the rockbolt force value includes: extracting two-dimensional spatial feature based on the preset convolutional neural network, the deformation data and the rockbolt force value; and performing a model training with the two-dimensional spatial feature as input data and with the rockbolt force value as prediction data to obtain the rockbolt force inversion model.

Specifically, after obtaining the deformation data and the corresponding rockbolt force value, the model construction system analyzes the deformation data through the preset convolutional neural network to obtain data features of the deformation data, and determines a main data feature as the two-dimensional spatial feature.

Further, the model construction system performs the model training through the preset convolutional neural network with the two-dimensional spatial feature as the input data and the rockbolt force value as the prediction data to obtain the rockbolt force inversion model.

Further, extracting the two-dimensional spatial feature based on the preset convolutional neural network, the deformation data and the rockbolt force value includes: performing an inner product operation on the deformation data via the preset convolutional neural network with the rockbolt force value as a label to obtain the two-dimensional spatial feature.

Specifically, after the model construction system obtains the deformation data and the rockbolt force value, the deformation data is input to the convolutional neural network with the horizontal and longitudinal coordinates of the first target point cloud in the deformation data as element subscripts of an input matrix and with the offset data in the deformation data as an element value of the input matrix, and an inner product operation is performed on the offset data through a filter in the neural network to extract the data features. The inner product operation formula is as follows:

$$O = W \otimes I + b;$$

$$O_{ij} = \sum_{l \in (i-n, i+n)} \sum_{k \in (j-n, j+n)} (W_{l,k} I_{l,k} b_{l,k});$$

where O is an input matrix with a scale of n*n; W is a weight matrix; I is the input matrix; b is an bias matrix; $O_{i,j}$ is a data feature in an i-th row and a j-th column of the output matrix; $W_{l,k}$ is a k-th weight matrix in an 1-th row with a general scale of 3*3; $I_{l,k}$ is an element value in an i-th row and a j-th column of the input matrix; and $b_{l,k}$ is an element value an 1-th row and a k-th column of the bias matrix.

Further, the model construction system performs data fitting on the data features via the preset convolutional neural network with the rockbolt force value as the label to determine data feature related to the rockbolt force value as the two-dimensional spatial feature.

In embodiments of the present disclosure, feature extraction is first performed on the deformation data to obtain the data features, and then the data feature related to the rockbolt force value is determined as the two-dimensional spatial feature. The model training is performed using the two-dimensional spatial feature, so that the rockbolt force inversion model can accurately monitor the loading condition of the rockbolt through the data feature.

Further, after constructing the rockbolt force inversion model based on the preset convolutional neural network, the first morphological point cloud, the second morphological point cloud and the rockbolt force value, the method further includes: acquiring a third morphological point cloud of a bearing plate to be monitored based on the laser scanner, the third morphological point cloud being a point cloud acquired in a loading condition of a rockbolt of the bearing plate to be monitored; and inputting the third morphological point cloud into the rockbolt force inversion model to output the loading condition of the rockbolt of the bearing plate to be monitored through the rockbolt force inversion model.

Specifically, after the model construction system obtains the rockbolt force inversion model, points to be measured on a surface of the bearing plate to be monitored are determined according to the preset rule, and point cloud coordinates of each point to be measured are acquired by the laser scanner to obtain the third morphological point cloud of the bearing plate to be monitored. The bearing plate to be monitored may be a bearing plate in rockbolt support practice or a bearing plate installed in the laboratory.

Further, the laser scanner inputs the obtained third morphological point cloud into the rockbolt force inversion model.

Further, the rockbolt force inversion model extracts data features of the third morphological point cloud and outputs the loading condition of the rockbolt of the bearing plate to be monitored according to the data features.

Further, the model construction system compares the loading condition of the rockbolt output from the rockbolt force inversion model with an actual loading condition of the rockbolt, and adjusts the rockbolt force inversion model according to a comparison result.

Figure 6:
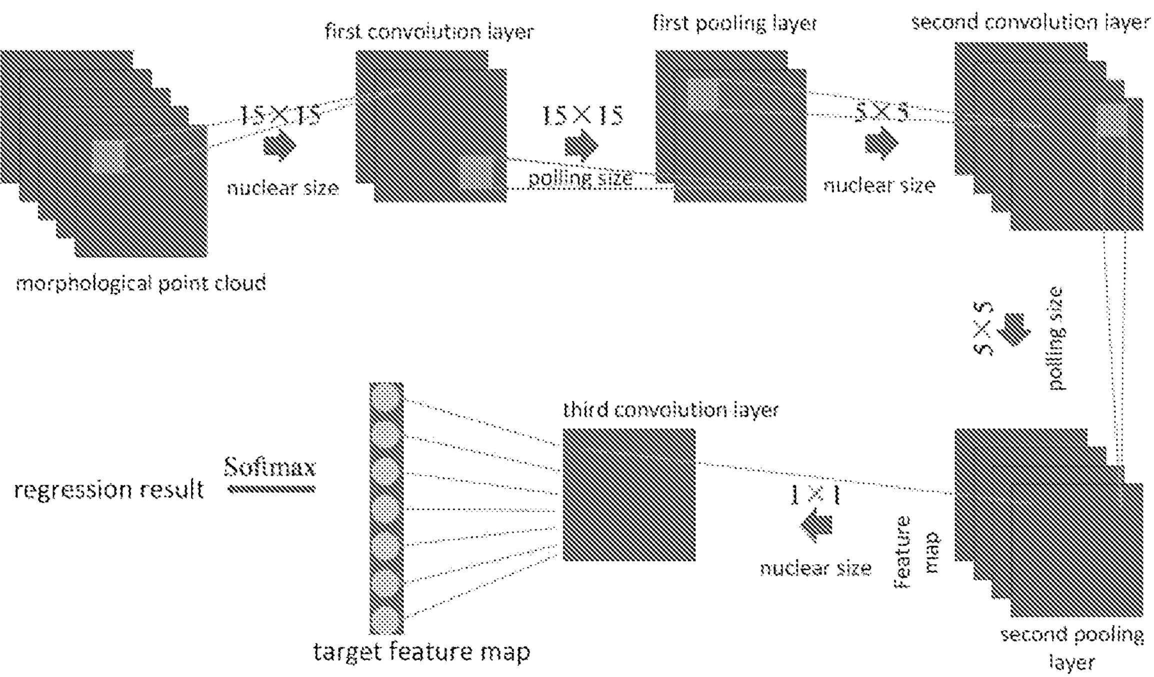
FIG. 6 is a schematic algorithm flowchart of a rockbolt force inversion model provided by embodiments of the present disclosure.

In an embodiment, the rockbolt force inversion model convolves the third morphological point cloud via a first convolution layer to obtain a first feature map. Further, the rockbolt force inversion model pools the first feature map via a first pooling layer to obtain a second feature map. Further, the rockbolt force inversion model convolves the second feature map via a second convolution layer to obtain a third feature map. Further, the rockbolt force inversion model pools the third feature map via a second pooling layer to obtain a fourth feature map. Further, the rockbolt force inversion model convolves the fourth feature map via a third convolution layer to obtain a target feature map. Further, the rockbolt force inversion model performs a regression test to the target feature map via Softmax to obtain the loading condition of the rockbolt. The processing of the third morphological point cloud via the rockbolt force inversion model is shown in FIG. 6, which is a schematic algorithm flowchart of the rockbolt force inversion model provided via embodiments of the present disclosure.

Figure 7:
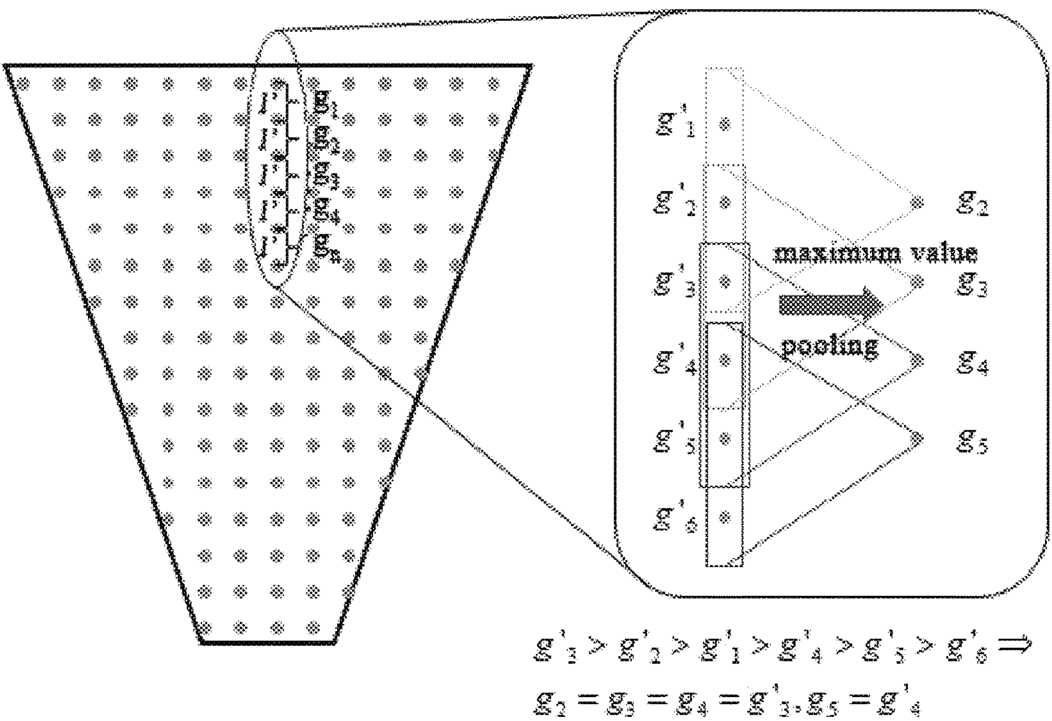
FIG. 7 is a schematic flowchart for selecting intermediate variables provided by embodiments of the present disclosure.

Further, in the above embodiment, in the pooling process of the feature maps via the pooling layers, the rockbolt force inversion model first determines three adjacent intermediate variables in a feature map, and determines a largest intermediate variable as an intermediate variable of the output feature map, thereby ensuring structural continuity. For example, a pooling layer selects six adjacent intermediate variables in a feature map, and the six adjacent intermediate variables are $g'_1$, $g'_2$, $g'_3$, $g'_4$, $g'_5$ and $g'_6$. Further, the pooling layer determines a maximum value $g'_3$ from $g'_1$, $g'_2$, and $g'_3$ as an intermediate variable $g_2$ of the output feature map; determines a maximum value $g'_3$ from $g'_2$, $g'_3$, and $g'_4$ as an intermediate variable $g_3$ of the output feature map; determines a maximum value $g'_3$ from $g'_3$, $g'_4$, and $g'_5$ as an intermediate variable $g_4$ of the output feature map; and determines a maximum value $g'_4$ from $g'_4$, $g'_5$, and $g'_6$ as an intermediate variable $g_5$ of the output feature map. The process of selecting intermediate variables by the pooling layer is shown in FIG. 7, which is a schematic flowchart for selecting intermediate variables provided by embodiments of the present disclosure.

In embodiments of the present disclosure, feature extraction is performed on the third morphological point cloud by the rockbolt force inversion model. The loading condition of the rockbolt is determined according to the extracted data features, and is compared with an actual loading condition of the rockbolt. The rockbolt force inversion model is adjusted according to the comparison result to further improve the accuracy of the rockbolt force inversion model.

Further, a system for constructing a rockbolt force inversion model based on laser scanning of a bearing plate provided in the present disclosure is cross-referenced to the method for constructing the rockbolt force inversion model based on the laser scanning of the bearing plate provided in the present disclosure.

Figure 8:
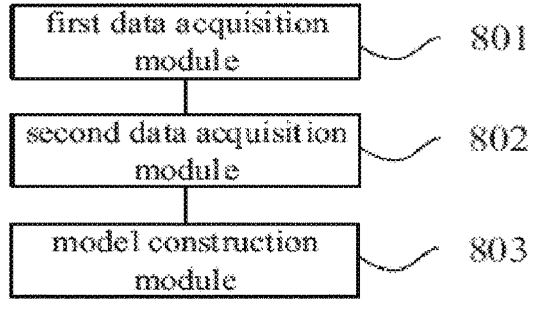
FIG. 8 is a schematic block diagram of a system for constructing a rockbolt force inversion model based on laser scanning of a bearing plate provided by embodiments of the present disclosure.

FIG. 8 is a schematic block of a system for constructing a rockbolt force inversion model based on laser scanning of a bearing plate provided by embodiments of the present disclosure. Referring to FIG. 8, the system for constructing the rockbolt force inversion model based on the laser scanning of the bearing plate includes: a first data acquisition module 801, a second data acquisition module 802, and a model construction module 803.

The first data acquisition module 801 is configured to obtain a first morphological point cloud of a bearing plate based on a laser scanner. The first morphological point cloud is a point cloud acquired in a case where no loading is applied to a rockbolt.

The second data acquisition module 802 is configured to obtain a second morphological point cloud of the bearing plate based on the laser scanner. The second morphological point cloud is a point cloud acquired in a loading condition of the rockbolt.

The model construction module 803 is configured to construct the rockbolt force inversion model based on a preset convolutional neural network, the first morphological point cloud, the second morphological point cloud and a rockbolt force value. The preset convolutional neural network is a feed-forward neural network containing a convolutional computation and having a depth structure; and the rockbolt force value is a tension value acquired in the loading condition of the rockbolt.

Further, the first data acquisition module 801 is further configured to: acquire distance values, vertical angle values and horizontal angle values of points to be measured in the bearing plate based on the laser scanner; obtain three-dimensional coordinates of the points to be measured according to the distance values, the vertical angle values and the horizontal angle values of the points to be measured; and collect the three-dimensional coordinates of the points to be measured to obtain the first morphological point cloud.

Further, the model construction module 803 is further configured to: obtain deformation data based on the first morphological point cloud and the second morphological point cloud; and construct the rockbolt force inversion model based on the preset convolutional neural network, the deformation data and the rockbolt force value.

Further, the model construction module 803 is further configured to: determine a first target point cloud in the first morphological point cloud, and determine a second target point cloud in the second morphological point cloud; and the first target point cloud having a same horizontal coordinate as the second target point cloud, and the first target point cloud having a same longitudinal coordinate as the second target point cloud; obtain offset data of the bearing plate based on the vertical coordinate of the first target point cloud and the vertical coordinate of the second target point cloud; and obtain the deformation data based on the horizontal and longitudinal coordinates of the first target point cloud and the offset data.

Further, the model construction module 803 is further configured to: extract two-dimensional spatial feature based on the preset convolutional neural network, the deformation data and the rockbolt force value; and perform a model training with the two-dimensional spatial feature as input data and with the rockbolt force value as prediction data to obtain the rockbolt force inversion model.

Further, the model construction module 803 is further configured to: perform an inner product operation on the deformation data via the preset convolutional neural network with the rockbolt force value as a label to obtain the two-dimensional spatial feature.

Further, the model construction module 803 is further configured to: acquire a third morphological point cloud of a bearing plate to be monitored based on the laser scanner; the third morphological point cloud being a point cloud acquired in a loading condition of a rockbolt of the bearing plate to be monitored; and input the third morphological point cloud into the rockbolt force inversion model to output the loading condition of the rockbolt of the bearing plate to be monitored through the rockbolt force inversion model.

The specific embodiments of the system for constructing the rockbolt force inversion model based on the laser scanning of the bearing plate provided in the present disclosure are substantially the same as various embodiments of the method for constructing the rockbolt force inversion model based on the laser scanning of the bearing plate as described above, which will not be repeated herein.

Figure 9:
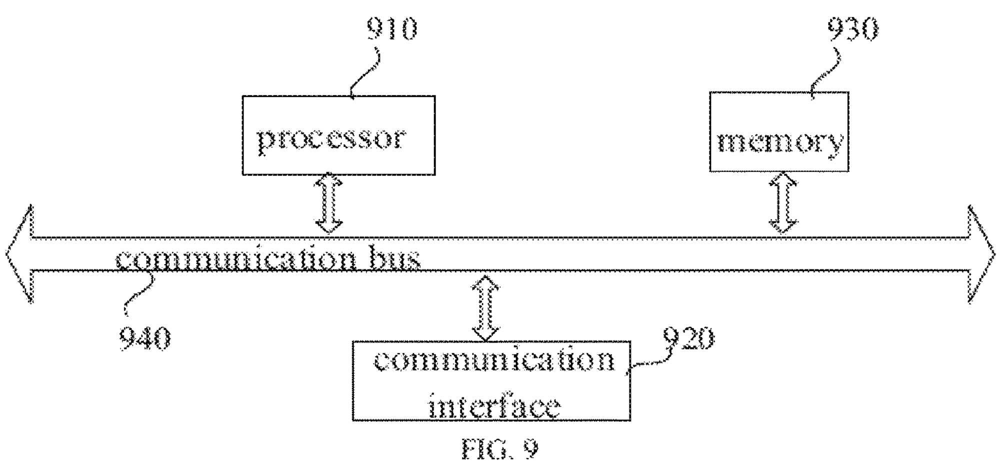
FIG. 9 illustrates a schematic block diagram of an entity of an electronic device provided by embodiments of the present disclosure.

FIG. 9 illustrates a schematic block diagram of an entity of an electronic device provided according to embodiments of the present disclosure. As shown in FIG. 9, the electronic device may include: a processor 910, a communication interface 920, a memory 930, and a communication bus 940. The processor 910, the communication interface 920, and the memory 930 communicate with each other via the communication bus 940. The processor 910 may call logical instructions in the memory 930 to execute a method for constructing a rockbolt force inversion model based on laser scanning of a bearing plate. The method includes: acquiring a first morphological point cloud of the bearing plate based on a laser scanner, the first morphological point cloud being a point cloud acquired in a case where no loading is applied to a rockbolt; acquiring a second morphological point cloud of the bearing plate based on the laser scanner; the second morphological point cloud being a point cloud acquired in a loading condition of the rockbolt; and constructing the rockbolt force inversion model based on a preset convolutional neural network, the first morphological point cloud, the second morphological point cloud and a rockbolt force value. The preset convolutional neural network is a feed-forward neural network containing a convolutional computation and having a depth structure; and the rockbolt force value is a tension value acquired in the loading condition of the rockbolt.

In addition, the logical instructions in the memory 930 described above may be stored in a computer-readable storage medium when implemented in a form of a software functional unit and sold or used as a stand-alone product. Based on this understanding, the technical solution of the present disclosure, a part thereof, or a part thereof that contributes to the related art may be embodied in a form of a software product. The computer software product is stored in a storage medium and includes a number of instructions to enable a computer device (which may be a personal computer, a server, or a network device, etc.) to execute all or part of the steps of the method described in various embodiments of the present disclosure. The aforementioned storage media include: a USB flash disk, a removable hard drive, a read-only memory (ROM), a random access memory (RAM), a magnetic disk or an optical disk, and other media that can store program code.

In another aspect, the present disclosure further provides a non-transitory computer-readable storage medium having stored therein a computer program that, when executed by a processor, causes the method for constructing the rockbolt force inversion model based on the laser scanning of the bearing plate as described in the above embodiments to be implemented. The method includes: acquiring a first morphological point cloud of the bearing plate based on a laser scanner, the first morphological point cloud being a point cloud acquired in a case where no loading is applied to a rockbolt; acquiring a second morphological point cloud of the bearing plate based on the laser scanner, the second morphological point cloud being a point cloud acquired in a loading condition of the rockbolt; and constructing the rockbolt force inversion model based on a preset convolutional neural network, the first morphological point cloud, the second morphological point cloud and a rockbolt force value. The preset convolutional neural network is a feed-forward neural network containing a convolutional computation and having a depth structure; and the rockbolt force value is a tension value acquired in the loading condition of the rockbolt.

The processor-readable storage medium may be any available medium or data storage device to which the processor can access, including, but not limited to, a magnetic memory (for example, a floppy disk, a hard disk, a magnetic tape, a magnetic optical disk (MO), etc.), an optical memory (for example, a CD, a DVD, a BD, a HVD, etc.), and a semiconductor memory (for example, a ROM, an EPROM, an EEPROM, a non-volatile memory (also called a NAND FLASH), and a solid state drive (SSD)), etc. The above-described apparatus embodiments are merely for the purpose of illustration, in which the units described as separate components may be or may not be physically separated, and the components displayed as units may be or may not be physical units, that is, the components may be located at one place or distributed onto a plurality of network units. The object of embodiments of the present disclosure may be achieved by some or all of the modules in accordance with practical requirements. Embodiments of the present disclosure would be appreciated and executable by those skilled in the art without creative efforts.

Embodiments of the present disclosure further provide a computer program product, including a computer program that, when executed by a processor, causes the method for constructing the rockbolt force inversion model based on the laser scanning of the bearing plate as described in the first aspect to be implemented.

From the description of the above implementations, it is clear to those skilled in the art that the various implementations may be implemented by means of a software and a necessary common hardware platform, and of course, may be implemented by means of a hardware. Based on this understanding, the technical solutions described above or a part thereof that contributes to the related art may be embodied in a form of a software product. The software product may be stored in a computer readable storage medium, such as a ROM/RAM, a magnetic disk, an optical disk, etc., and includes a number of instructions to enable a computer device (which may be a personal computer, a server, or a network device, etc.) to execute the methods described in various embodiments or some portions of the embodiments.

Finally, it should be noted that, the above embodiments are only used to illustrate the technical solutions of the present disclosure, rather than limit them. Although the present disclosure has been described in detail with reference to the foregoing embodiments, those ordinarily skilled in the art should understand that, it is still possible to modify the technical solutions described in the foregoing various embodiments, or to equivalently replace some of the technical features; and these modifications or replacements do not make the essence of the corresponding technical solutions deviate from the spirit and scope of the technical solutions of various embodiments of the present disclosure.

What is claimed is:

1. A method for constructing a rockbolt force inversion model based on laser scanning of a bearing plate, comprising:

acquiring a first morphological point cloud of the bearing plate based on a laser scanner; wherein the first morphological point cloud is a point cloud acquired in a case where no loading is applied to a rockbolt;

acquiring a second morphological point cloud of the bearing plate based on the laser scanner; wherein the second morphological point cloud is a point cloud acquired in a loading condition of the rockbolt; and constructing the rockbolt force inversion model based on a preset convolutional neural network, the first morphological point cloud, the second morphological point cloud and a rockbolt force value;

wherein the preset convolutional neural network is a feed-forward neural network containing a convolutional computation and having a depth structure; and the rockbolt force value is a tension value acquired in the loading condition of the rockbolt.

2. The method for constructing the rockbolt force inversion model based on the laser scanning of the bearing plate according to claim 1, wherein constructing the rockbolt force inversion model based on the preset convolutional neural network, the first morphological point cloud, the second morphological point cloud, and the rockbolt force value comprises:

obtaining deformation data based on the first morphological point cloud and the second morphological point cloud; and constructing the rockbolt force inversion model based on the preset convolutional neural network, the deformation data and the rockbolt force value.

3. The method for constructing the rockbolt force inversion model based on the laser scanning of the bearing plate according to claim 2, wherein obtaining the deformation data based on the first morphological point cloud and the second morphological point cloud comprises:

determining a first target point cloud in the first morphological point cloud, and determining a second target point cloud in the second morphological point cloud; wherein the first target point cloud has a same horizontal coordinate as the second target point cloud, and the first target point cloud has a same longitudinal coordinate as the second target point cloud;

obtaining offset data of the bearing plate based on a vertical coordinate of the first target point cloud and a vertical coordinate of the second target point cloud; and obtaining the deformation data based on the horizontal and longitudinal coordinates of the first target point cloud and the offset data.

4. The method for constructing the rockbolt force inversion model based on the laser scanning of the bearing plate according to claim 2, wherein constructing the rockbolt force inversion model based on the preset convolutional neural network, the deformation data and the rockbolt force value comprises:

extracting a two-dimensional spatial feature based on the preset convolutional neural network, the deformation data and the rockbolt force value; and performing a model training with the two-dimensional spatial feature as input data and with the rockbolt force value as prediction data to obtain the rockbolt force inversion model.

5. The method for constructing the rockbolt force inversion model based on the laser scanning of the bearing plate according to claim 4, wherein extracting the two-dimensional spatial feature based on the preset convolutional neural network, the deformation data and the rockbolt force value comprises:

performing an inner product operation on the deformation data via the preset convolutional neural network with the rockbolt force value as a label to obtain the two-dimensional spatial feature.

6. The method for constructing the rockbolt force inversion model based on the laser scanning of the bearing plate according to claim 1, wherein acquiring the first morphological point cloud of the bearing plate based on the laser scanner comprises:

acquiring distance values, vertical angle values and horizontal angle values of points to be measured in the bearing plate based on the laser scanner;

obtaining three-dimensional coordinates of the points to be measured according to the distance values, the vertical angle values and the horizontal angle values of the points to be measured; and collecting the three-dimensional coordinates of the points to be measured to obtain the first morphological point cloud.

7. The method for constructing the rockbolt force inversion model based on the laser scanning of the bearing plate according to claim 1, after constructing the rockbolt force inversion model based on the preset convolutional neural network, the first morphological point cloud, the second morphological point cloud and the rockbolt force value, further comprising:

acquiring a third morphological point cloud of a bearing plate to be monitored based on the laser scanner; wherein the third morphological point cloud is a point cloud acquired in a loading condition of a rockbolt of the bearing plate to be monitored; and inputting the third morphological point cloud into the rockbolt force inversion model to output the loading condition of the rockbolt of the bearing plate to be monitored through the rockbolt force inversion model.

8. An electronic device, comprising a memory, a processor and a computer program stored in the memory and runnable on the processor, wherein the processor is configured to:

acquire a first morphological point cloud of a bearing plate based on a laser scanner; wherein the first morphological point cloud is a point cloud acquired in a case where no loading is applied to a rockbolt;

acquire a second morphological point cloud of the bearing plate based on the laser scanner; wherein the second morphological point cloud is a point cloud acquired in a loading condition of the rockbolt; and construct a rockbolt force inversion model based on a preset convolutional neural network, the first morphological point cloud, the second morphological point cloud and a rockbolt force value;

wherein the preset convolutional neural network is a feed-forward neural network containing a convolutional computation and having a depth structure; and the rockbolt force value is a tension value acquired in the loading condition of the rockbolt.

9. The electronic device according to claim 8, wherein the processor is further configured to:

obtain deformation data based on the first morphological point cloud and the second morphological point cloud; and construct the rockbolt force inversion model based on the preset convolutional neural network, the deformation data and the rockbolt force value.

10. The electronic device according to claim 9, wherein the processor is configured to:

determine a first target point cloud in the first morphological point cloud, and determine a second target point cloud in the second morphological point cloud; wherein the first target point cloud has a same horizontal coordinate as the second target point cloud, and the first target point cloud has a same longitudinal coordinate as the second target point cloud;

obtain offset data of the bearing plate based on a vertical coordinate of the first target point cloud and a vertical coordinate of the second target point cloud; and obtain the deformation data based on the horizontal and longitudinal coordinates of the first target point cloud and the offset data.

11. The electronic device according to claim 9, wherein the processor is further configured to:

extract a two-dimensional spatial feature based on the preset convolutional neural network, the deformation data and the rockbolt force value; and perform a model training with the two-dimensional spatial feature as input data and with the rockbolt force value as prediction data to obtain the rockbolt force inversion model.

12. The electronic device according to claim 11, wherein the processor is further configured to:

perform an inner product operation on the deformation data via the preset convolutional neural network with the rockbolt force value as a label to obtain the two-dimensional spatial feature.

13. The electronic device according to claim 8, wherein the processor is further configured to:

acquire distance values, vertical angle values and horizontal angle values of points to be measured in the bearing plate based on the laser scanner;

obtain three-dimensional coordinates of the points to be measured according to the distance values, the vertical angle values and the horizontal angle values of the points to be measured; and collect the three-dimensional coordinates of the points to be measured to obtain the first morphological point cloud.

14. The electronic device according to claim 8, wherein the processor is further configured to:

acquire a third morphological point cloud of a bearing plate to be monitored based on the laser scanner; wherein the third morphological point cloud is a point cloud acquired in a loading condition of a rockbolt of the bearing plate to be monitored; and input the third morphological point cloud into the rockbolt force inversion model to output the loading condition of the rockbolt of the bearing plate to be monitored through the rockbolt force inversion model.

15. A non-transitory computer-readable storage medium, comprising a computer program that, when executed by a processor, causes a method for constructing a rockbolt force inversion model based on laser scanning of a bearing plate to be implemented, wherein the method comprises:

acquiring a first morphological point cloud of the bearing plate based on a laser scanner; wherein the first morphological point cloud is a point cloud acquired in a case where no loading is applied to a rockbolt;

acquiring a second morphological point cloud of the bearing plate based on the laser scanner; wherein the second morphological point cloud is a point cloud acquired in a loading condition of the rockbolt; and constructing the rockbolt force inversion model based on a preset convolutional neural network, the first morphological point cloud, the second morphological point cloud and a rockbolt force value;

wherein the preset convolutional neural network is a feed-forward neural network containing a convolutional computation and having a depth structure; and the rockbolt force value is a tension value acquired in the loading condition of the rockbolt.

16. The non-transitory computer-readable storage medium according to claim 15, wherein constructing the rockbolt force inversion model based on the preset convolutional neural network, the first morphological point cloud, the second morphological point cloud, and the rockbolt force value comprises:

obtaining deformation data based on the first morphological point cloud and the second morphological point cloud; and constructing the rockbolt force inversion model based on the preset convolutional neural network, the deformation data and the rockbolt force value.

17. The non-transitory computer-readable storage medium according to claim 16, wherein obtaining the deformation data based on the first morphological point cloud and the second morphological point cloud comprises:

determining a first target point cloud in the first morphological point cloud, and determining a second target point cloud in the second morphological point cloud; wherein the first target point cloud has a same horizontal coordinate as the second target point cloud, and the first target point cloud has a same longitudinal coordinate as the second target point cloud;

obtaining offset data of the bearing plate based on a vertical coordinate of the first target point cloud and a vertical coordinate of the second target point cloud; and obtaining the deformation data based on the horizontal and longitudinal coordinates of the first target point cloud and the offset data.

18. The non-transitory computer-readable storage medium according to claim 16, wherein constructing the rockbolt force inversion model based on the preset convolutional neural network, the deformation data and the rockbolt force value comprises:

extracting a two-dimensional spatial feature based on the preset convolutional neural network, the deformation data and the rockbolt force value; and performing a model training with the two-dimensional spatial feature as input data and with the rockbolt force value as prediction data to obtain the rockbolt force inversion model.

19. The non-transitory computer-readable storage medium according to claim 18, wherein extracting the two-dimensional spatial feature based on the preset convolutional neural network, the deformation data and the rockbolt force value comprises:

performing an inner product operation on the deformation data via the preset convolutional neural network with the rockbolt force value as a label to obtain the two-dimensional spatial feature.

20. The non-transitory computer-readable storage medium according to claim 16, wherein acquiring the first morphological point cloud of the bearing plate based on the laser scanner comprises:

acquiring distance values, vertical angle values and horizontal angle values of points to be measured in the bearing plate based on the laser scanner;

obtaining three-dimensional coordinates of the points to be measured according to the distance values, the vertical angle values and the horizontal angle values of the points to be measured; and collecting the three-dimensional coordinates of the points to be measured to obtain the first morphological point cloud.

* * * * *